United States Patent
MacNeil et al.

(10) Patent No.: US 7,159,600 B2
(45) Date of Patent: Jan. 9, 2007

(54) SCARIFYING APPARATUS FOR INTERIOR SURFACE OF PIPELINE FIELD

(75) Inventors: Gerard J. MacNeil, Surrey (CA); David B. MacNeil, Langley (CA); Gordon W. MacNeil, Delta (CA); Vernon G. Bose, Langley (CA)

(73) Assignee: Mac & Mac Hydrodemolition Inc. (CA)

( * ) Notice: Subject to any disclaimer, the term of this patent is extended or adjusted under 35 U.S.C. 154(b) by 556 days.

(21) Appl. No.: 10/378,636

(22) Filed: Mar. 5, 2003

(65) Prior Publication Data

US 2004/0099288 A1    May 27, 2004

(51) Int. Cl.
*B08B 3/02*    (2006.01)
(52) U.S. Cl. ............... 134/199; 134/166 R; 134/167 R; 134/168 R; 134/167 C; 134/169 C; 134/166 C; 134/171; 134/172; 134/187; 134/198; 239/140; 239/743; 239/744
(58) Field of Classification Search ............... 134/22.1, 134/22.18, 24, 166 R, 167 R, 168 C, 167 C, 134/169 C, 166 C, 171, 172, 187, 198, 199; 239/140, 743, 744
See application file for complete search history.

(56) References Cited

U.S. PATENT DOCUMENTS

| | | | |
|---|---|---|---|
| 3,267,504 A | * | 8/1966 | Cook et al. ............... 15/104.14 |
| 4,244,523 A | * | 1/1981 | Looper ........................ 239/227 |
| 4,559,960 A | * | 12/1985 | Lanier ..................... 134/166 C |
| 5,020,188 A | | 6/1991 | Walton |
| 5,352,298 A | * | 10/1994 | Moulder ................... 134/22.18 |
| 5,377,913 A | | 1/1995 | Van Der Woude |
| 5,829,461 A | * | 11/1998 | Ramsey .................. 134/167 R |
| 5,851,580 A | | 12/1998 | Amberg et al. |
| 6,206,016 B1 | | 3/2001 | MacNeil et al. |
| 6,224,162 B1 | | 5/2001 | MacNeil et al. |
| 6,418,947 B1 | | 7/2002 | MacNeil et al. |

FOREIGN PATENT DOCUMENTS

| DE | 298 02 660 U 1 | | 5/1998 |
|---|---|---|---|
| FR | 589709 | | 6/1925 |
| FR | 2671298 | * | 7/1992 |
| JP | 5-256433 | * | 10/1993 |

* cited by examiner

*Primary Examiner*—M. Kornakov
(74) *Attorney, Agent, or Firm*—Vermette & Co

(57) ABSTRACT

The invention relates to an apparatus for scarifying the interior surface of a sewer pipe. The apparatus consists of a chassis, with an outer frame coupled to the chassis and an inner frame slidably coupled to the outer frame. Two extendible arms are attached to opposite sides of the inner frame. Each arm has a nozzle assembly mounted on the end, each nozzle assembly having a plurality of fluid jets for spray water onto the interior surface of the pipeline. The nozzle assembly may be pivotally mounted to allow for greater control of the fluid jets. The apparatus further includes a propulsion system for movement of the apparatus along the pipeline.

10 Claims, 5 Drawing Sheets

SCARIFYING APPARATUS FOR INTERIOR SURFACE OF PIPELINE FIELD

The invention relates to an adjustable apparatus for scarifying the interior surfaces of pipelines, particularly sewer pipelines.

BACKGROUND OF THE INVENTION

Pipes used to carry liquids and gases commonly transport all types of materials including water, natural gas and liquid sewage. Over time, these pipes require servicing and cleaning. MacNeil et al. disclose an automated process for cleaning or restoring the inside of a pipe in U.S. Pat. No. 6,206,016. Macneil et al. use a single cleaning arm, which creates a helical cleaning pattern on a circular pipe. However, for pipes that deviate from a circular shape, the MacNeil process is limited, as the helical pattern is more difficult to maintain. Therefore, a device capable of more efficiently scarifying the interior surfaces of pipelines is desired.

The interior surface of a pipeline carrying solids, liquids and gases generally degrades over time as the pipe walls interact chemically and physically with the substances flowing through them and air. In particular, a sewer system's interior walls corrode and deteriorate because corrosive materials contaminate the surface, degrading the metal and concrete used to build the sewer pipe. The corrosive material arises from both the sewage and waste water itself, and also from the digestible by-products of bacteria found in the sewage which proliferate in the anaerobic environment. The corrosion causes the walls of the sewer pipe to physically decay, eventually reducing their overall thickness.

The principle source of corrosion is sulfuric acid, which arises as a product of the reaction of sewer gases with water and air in the sewer pipe and the sewer environment itself. Various metal sulfates found in the sewage quickly convert into hydrogen sulfide by reducing to sulfide ions in the waste water, combining with hydrogen in water and outgassing above the liquid as hydrogen sulfide gas. Additional hydrogen sulfide originates from bacteria-containing contaminants which accumulate on the relatively rough concrete below the maximum liquid level. Bacteria found in these accumulations thrive in the anaerobic sewer environment producing hydrogen sulfide gas as a respiratory by-product. Oxygen from the liquid below and oxygen condensing from the water in the air react with the hydrogen sulfide on the pipeline walls creating the highly corrosive sulfuric acid. The sulfuric acid attacks the calcium hydroxide in the concrete sewer walls leaving calcium sulfates which ultimately crumble and fall off the interior of the wall substantially reducing its thickness.

The waste water level varies over the course of a 24-hour period. The flow is at its lowest level between 1:00 a.m. and 6:00 a.m. in the morning but it rises distinctly in the daytime when the pipe may operate near capacity. Because of the gaseous nature of the hydrogen sulfide, the pipe walls are predominately corroded in the portions of the wall above the minimum liquid level. Portions of the walls which are always below the water level are not subjected to such high concentrations of hydrogen sulfide gas or sulfuric acid and consequently do not experience the same level of decay.

Eventually the sewer walls must be restored or they can suffer permanent damage leading to great expense. The restoration process is a two-step operation that consists of first scarifying the interior pipe surface to remove the contaminants (including any possibly existing outer layers of corrupted concrete) from the surface of the pipe, i.e. a process herein defined as scarifying, and then applying a protective coating over the newly cleaned (scarified) pipe surface. Attempting to apply a protective coating without first scarifying the pipe surface is futile because it does not stop the decay that has already begun underneath the coating. Furthermore, the protective coating itself does not adhere well to the contaminated surface. Thus, scarifying is an essential element of the restoration process.

As previously mentioned, the sewer typically operates at high capacity during the day with a decreased flow overnight. In order to restore the sewer pipes without diverting the flow (a costly and sometimes impossible alternative), a bulk of the work must be done at night during the brief period when the flow is at a minimum. As previously outlined, the restoration process involves both scarifying the pipe surface and applying a protective coat. In practice, the rate of restoration is impaired because manual scarifying takes a proportionally greater amount of time than does the application of the protective coat. Consequently, efficiency of the scarifying device is paramount to ensure that the maximum possible amount of work can be achieved during the minimum flow period. As multiple nights are typically required, it is also preferable to have a device that can be rapidly deployed to resume scarifying operations where they were left off the previous night.

SUMMARY OF THE INVENTION

The present invention relates to an apparatus for scarifying the interior surface of a sewer pipe. The apparatus consisting of a chassis, with an outer frame coupled to the chassis and an inner frame slidably coupled to the outer frame.

Two extendible arms are attached to opposite sides of the inner frame. Each arm has a nozzle assembly mounted on the end, each nozzle assembly having a plurality of fluid jets for spraying water onto the interior surface of the pipeline. The nozzle assembly may be pivotally mounted to allow for greater control of the fluid jets.

The apparatus also includes a propulsion system for movement along the pipeline. Preferably, a pair of spaced apart tracks are used, although a set of wheels may be used as an alternative. A combination of wheels and tracks can be used, with the wheels being retractable and used for high-speed propulsion while the tracks are used for low-speed propulsion.

Preferably, the scarifying apparatus is controlled remotely, both for propulsion and adjustment of the frame, arms and nozzle assemblies.

The invention further includes a method of using the scarifying apparatus to scarify an interior surface of a pipeline.

An advantage of present invention is improved rates of scarifying of the sewer pipe's interior walls. A further advantage is assurance that the same intensity of scarifying is applied to the entire surface without the quality variation that is inherent in manual execution.

BRIEF DESCRIPTION OF THE DRAWINGS

The invention itself both as to organization and method of operation, as well as additional objects and advantages thereof, will become readily apparent from the following detailed description when read in connection with the accompanying drawings.

DETAILED DESCRIPTION

Figure 1:
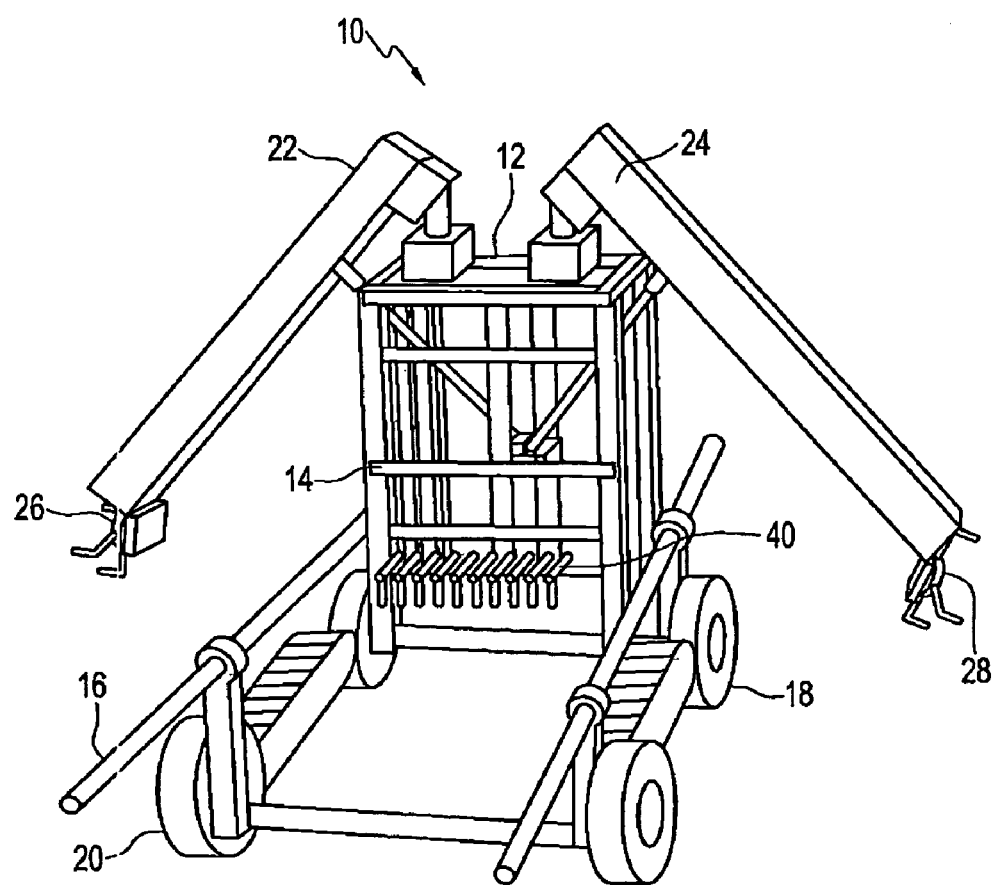
FIG. 1 is a front view of a scarifying apparatus with the extendible arms lowered.
Figure 2:
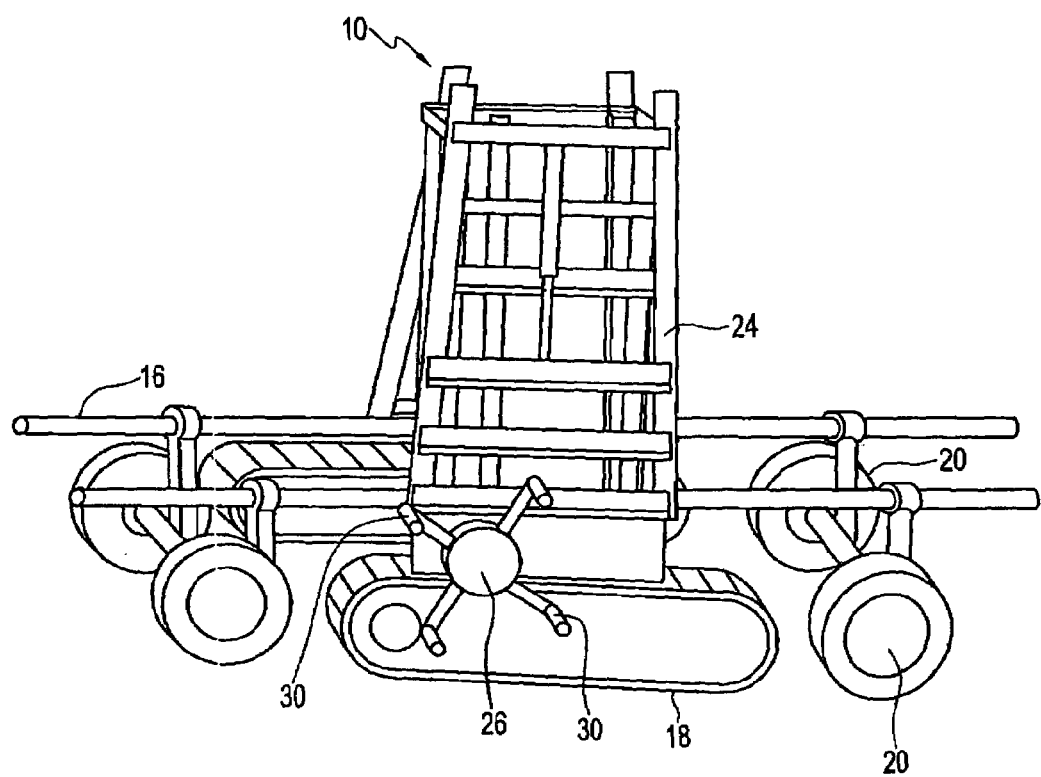
FIG. 2 is a side view of a scarifying apparatus with the extendible arms lowered.
Figure 3:
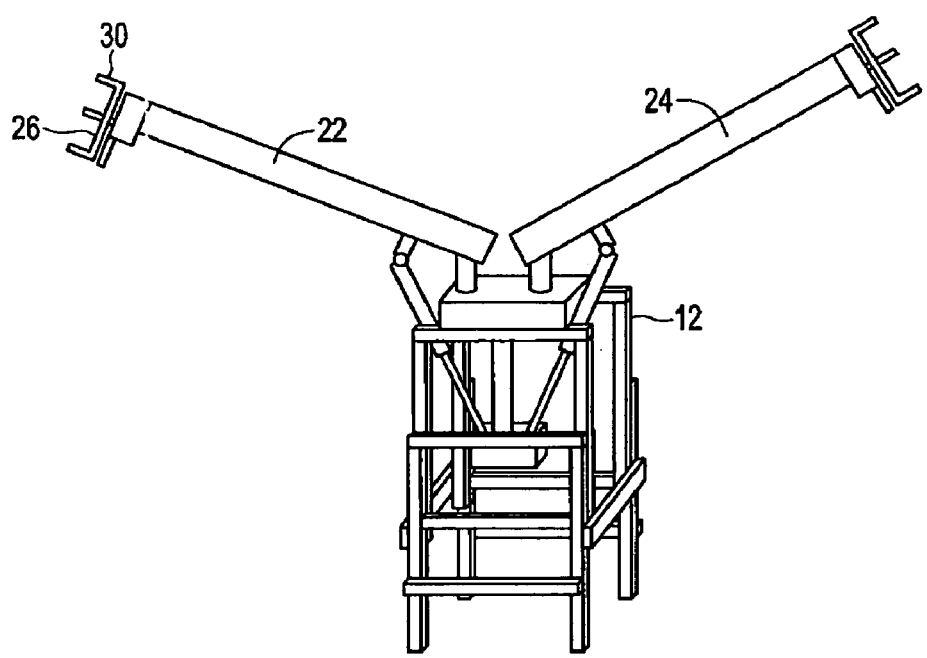
FIG. 3 is a front view of a scarifying apparatus with the extendible arms raised.
Figure 4:
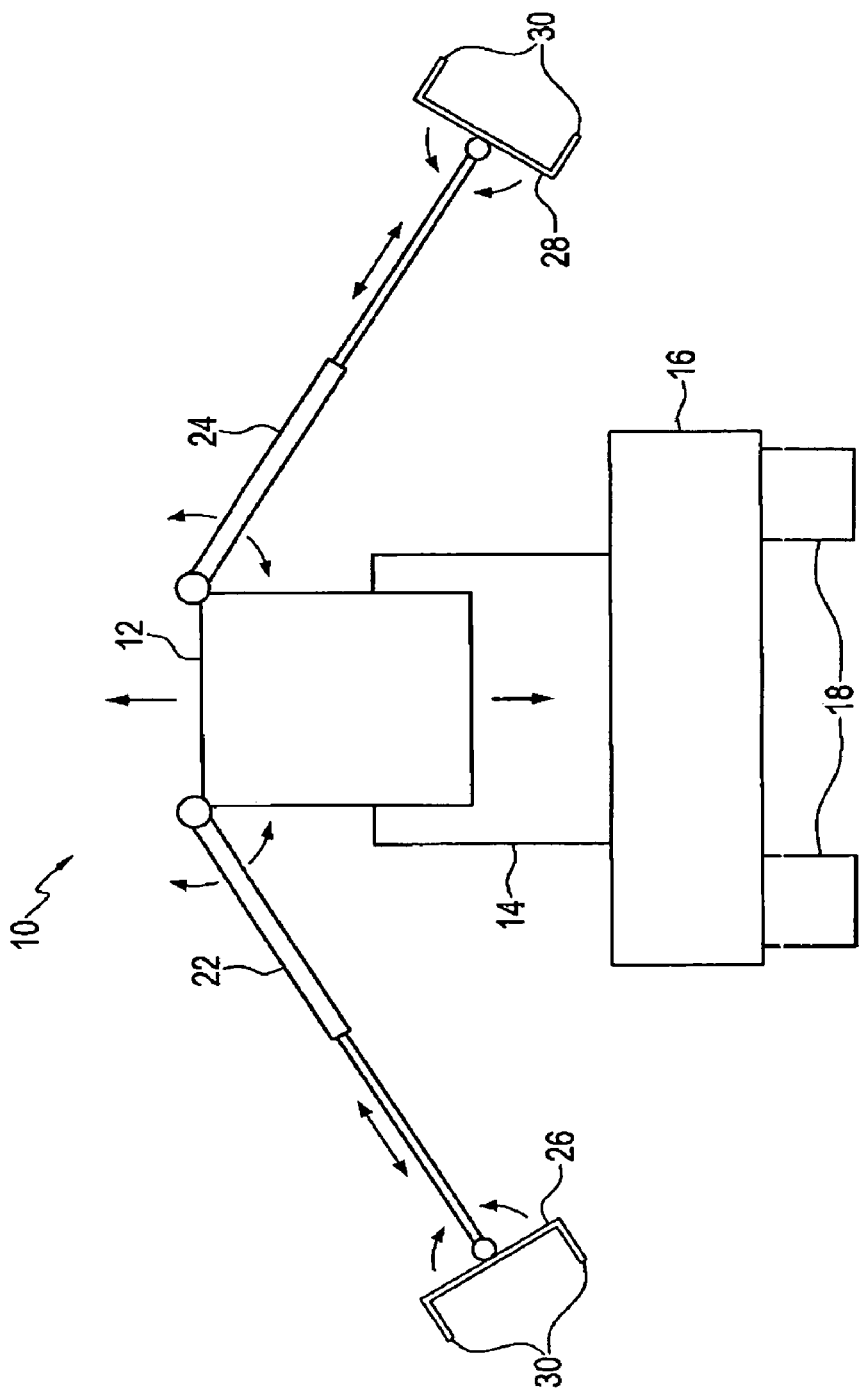
FIG. 4 is a diagram showing the possible adjustment positions for a scarifying apparatus with telescoping arms.
Figure 5:
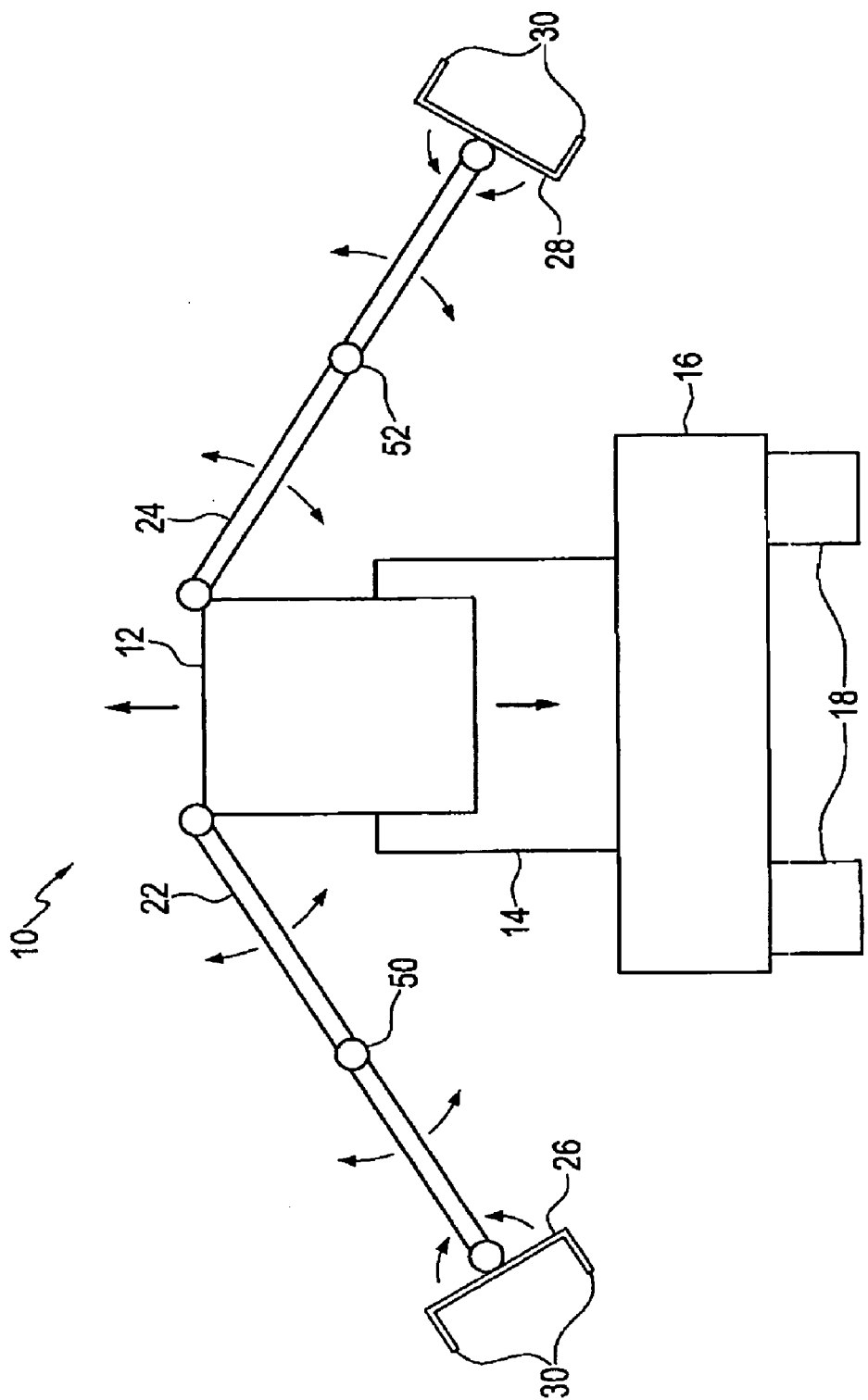
FIG. 5 is a diagram showing the possible adjustment positions for a scarifying apparatus with pivoting arms.

The scarifying apparatus 10 shown in FIG. 1 consists of an inner frame 12 slidably mounted inside an outer frame 14 and moveable vertically with respect to the latter as seen in FIGS. 4 and 5. The outer frame 14 is coupled to a chassis 16. The chassis 16 is propelled by a set of tracks 18. The chassis may further include a set of wheels 20 as an alternate means of propulsion, which is discussed below.

A pair of telescoping arms 22 and 24 are pivotally mounted opposite each other on top of the inner frame 12. Each telescoping arm 22 and 24 has a nozzle assembly 26 and 28 pivotally mounted at its far end. Each nozzle assembly 26 and 28 is comprised of a plurality of fluid jets 30, which rotate about a central axis.

The fluid jets 30 each dispense water at 25,000 PSI or greater for the purpose of scarifying the interior surface of a pipeline through which the scarifying apparatus 10 travels. The chassis 16 also includes a fluid exchanger 40 to control and direct water flow through the fluid jets 30. The water is received from an external source (not shown), and water supply lines run from the chassis 16 to the external source.

Movement of the inner frame 12, telescoping arms 22 and 24 and nozzle assemblies 26 and 28 are preferably controlled by hydraulics. The hydraulic fluid runs through a central unit mounted to the chassis. The central unit can be controlled by controls located on the chassis, or remotely by an operator. Other methods of control such as electronic actuators may be used provided they are sufficiently resilient for the environment in which the scarifying apparatus 10 is to be used.

The scarifying apparatus 10 is normally propelled by the tracks 18. The tracks 18 can be driven by any power source, although an exhaustless motor is preferred for operation inside sewer pipes. The chassis 16 can also include a set of wheels 20. Preferably, the wheels 20 are retractable, however, the wheels 20 may also simply be removable and installed as needed.

The tracks 18 are used to propel the apparatus 10 at a relatively slow speed, while the wheels 20 provide an alternative method of high-speed propulsion. When high-speed travel is desired, the wheels 20 are extended sufficiently to raise the tracks 18 off the surface on which the apparatus is traveling. The apparatus 10 can then be propelled by the wheels 20 at a substantially greater speed than if the tracks 18 were used. Once high-speed travel is no longer desired, the wheels 20 can be retracted in order to allow the tracks 18 to contact the surface and resume their role as the source of propulsion. As discussed above, the wheels 20 may alternatively be a removable part, in which case the wheels 20 are attached or removed as needed.

To scarify a sewer pipeline, or a section of a sewer pipeline, first the inner frame 12 and telescoping arms 22 and 24 are adjusted to place the nozzle assemblies 26 and 28 in close proximity to the interior wall of the pipeline. The direction of adjustment for all parts is shown in FIG. 4. The nozzle assemblies 26 and 28 are pivoted such that the fluid jets 30 are positioned to spray jets of water perpendicular to the interior surface. Once the fluid jets 30 are in position, the apparatus 10 is propelled by tracks 18 in a direction coincident with the long axis of the pipeline while the fluid jets 30 emit water at 25,000 psi or greater. The result is that a section of the interior surface of the pipeline equal to the width of the nozzle assemblies 26 and 28 is scarified.

In a variation of the apparatus 10 shown in FIG. 5, the opposed arms 22 and 24 have a pivoting joint 50, 52 in the middle of the arm, dividing each arm into an inner arm and an outer arm. The inner and outer arms are thus pivoted to locate the nozzle assemblies 26 and 28 proximate to the interior surface of the pipeline.

One advantage of using two opposed arms is that the water pressure from the fluid jets on one arm will negate the effect of the water pressure from the fluid jets on the other arm. The result is a stable apparatus without the need for any counterweights or other balancing equipment that a single-arm apparatus requires.

Once the apparatus 10 has been propelled a predetermined distance down the pipeline, it is stopped. The inner frame 12, telescoping arms 22 and 24, nozzle assemblies 26 and 28 and fluid jets 30 are adjusted as described above to be in position to scarify the interior surface of the pipeline adjacent to the area previously scarified. The apparatus is then propelled by tracks 18 back to the original starting point, scarifying the interior surface of the pipeline adjacent to the area scarified on the previous pass.

After several passes, the entire interior surface of the pipeline, or as much of the interior surface as desired, is scarified. The apparatus 10 is then moved to the next section of pipeline and the process repeats.

In the case of very long pipelines with limited access, it may not be possible to complete a scarifying operation in the available timeframe. In that case, the apparatus 10 can be propelled by wheels 20 to reach the point where the scarifying operation was previously stopped. The scarifying operation may then proceed from that point as if no interruption had taken place. By using the high-speed transportation provided by the wheels 20 the scarifying operation can be resumed more quickly, as well as reducing wear on the tracks 18.

Control of the movement of the apparatus 10 and adjustment of the frame 12 and arms 22 and 24 is typically done remotely, by radio control (if possible) or by control wires connected to the chassis 16 in the same manner as the fluid supply lines. In certain cases, if the apparatus is of sufficient size, control may be provided by an on-board operator, preferably in a shielded cab. More generally, any means of on-board or remote control can be readily adapted for use with the scarifying apparatus. Fluid control (water pressure) is handled in a similar manner, although it is generally preferable for fluid control to take place at the fluid source, which is almost always located remotely from the apparatus 10.

By having two separate extendible arms 22 and 24 with pivoting nozzle assemblies 26 and 28, it is possible for the scarifying apparatus 10 to be adjusted to conform to almost any shape of pipeline. Irregularities and deviations from a standard circular or oval pipeline can be readily addressed by proper adjustment of one or both of the arms 22 and 24 as necessary. Similar adjustments can be made to account for pipelines that are curved or contain angled turns. As a result, the scarifying process can proceed in substantially the same way, regardless of the shape or condition of the pipeline.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

We claim:

1. An apparatus for scarifying an interior surface of a pipeline, comprising:
   a) a chassis;
   b) an outer frame affixed to said chassis;
   c) an inner frame coupled to and located within said outer frame and vertically moveable relative to said outer frame;
   d) two extendible arms coupled to said inner frame, one of said arms pivotally attached to one side of said inner frame and another of said arms pivotally attached to another side of said inner frame opposite said one side;
   e) a pair of nozzle assemblies, one mounted on a distal end of each of said extendible arms, each said nozzle assembly comprised of one or more nozzles, said nozzles operative to project jets of fluid onto said interior surface of said pipeline and wherein said nozzles are adjustable to conform the interior surface of the pipeline at the time of scarifying regardless of the shape of pipeline; and
   f) a propulsion system coupled to said chassis, operative to move said apparatus along a support surface.

2. An apparatus according to claim 1, wherein said propulsion system includes a pair of spaced apart tracks positioned on either side of said chassis, said tracks operative upon rotation to propel said vehicle in a longitudinal direction in the interior of said pipe along said support surface, said spaced apart tracks being laterally adjustable to accommodate various pipe sizes.

3. An apparatus according to claim 2, wherein said propulsion system further includes two wheels positioned on either side of said chassis, aligned longitudinally with said spaced apart tracks, said wheels, when in an engaged position contacting said support surface, being operative to hold said tracks above said support surface.

4. An apparatus according to claim 3, wherein said wheels are reversibly retractable from said engaged position to a disengaged position where said wheels are out of engagement with said support surface.

5. An apparatus according to claim 1, wherein said nozzle assemblies are pivotally mounted to said extendible arms to allow for adjustment to maintain a fixed angle between said fluid jets and said interior surface.

6. An apparatus according to claim 1, wherein each said nozzle assembly rotates about an axis parallel to said extendible arm on which said nozzle assembly is mounted.

7. An apparatus according to claim 1, wherein each of said two extendible arms is pivotally coupled to said inner frame.

8. An apparatus according to claim 7, wherein each of said two extendible arms is independently adjustable.

9. An apparatus according to claim 8, wherein each of said two extendible arms is telescopically extendible.

10. An apparatus according to claim 1, wherein said apparatus is operated and controlled remotely.

* * * * *